June 11, 1957 M. G. JACOBSON ET AL 2,795,756
GAS DETECTION
Filed Feb. 27, 1953 3 Sheets-Sheet 1

INVENTORS
Moses S. Jacobson,
Frank J. De Luca,
Alexander C. McInnes,
BY John B. Brady
ATTORNEY June 11, 1957    M. G. JACOBSON ET AL    2,795,756
GAS DETECTION
Filed Feb. 27, 1953    3 Sheets-Sheet 2
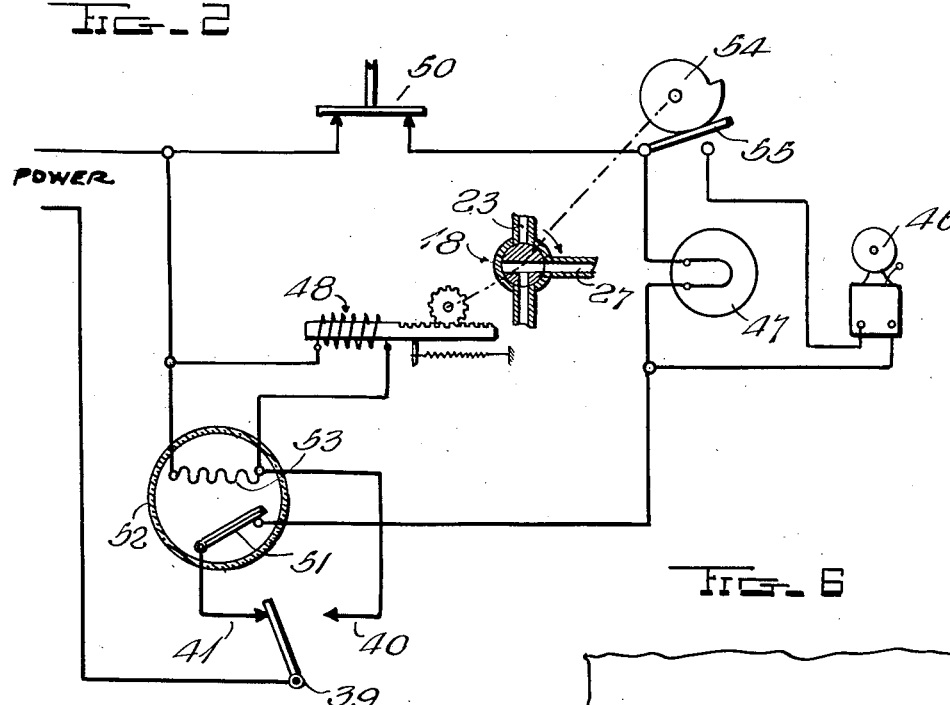
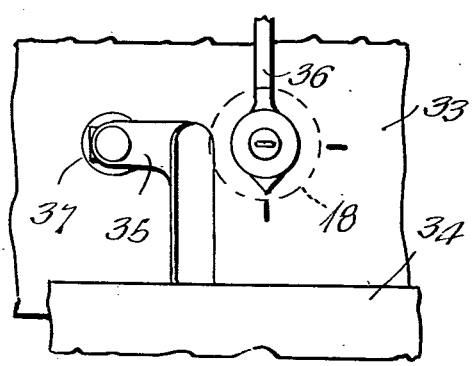
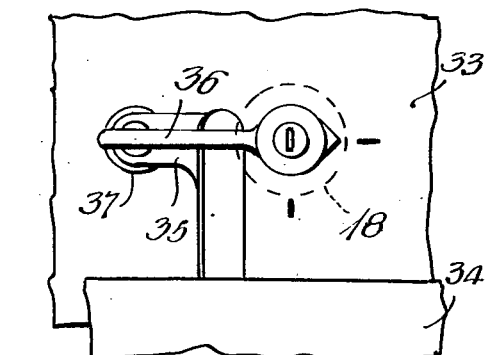
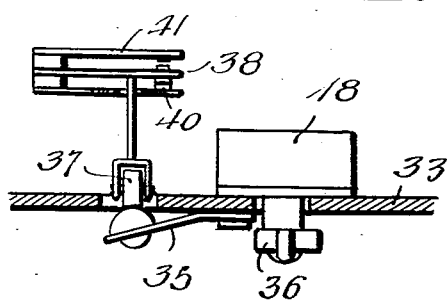
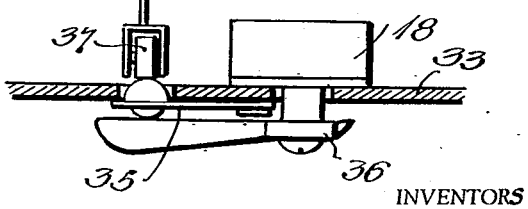
INVENTORS
Moses G. Jacobson,
Frank J. De Luca,
Alexander C. McInnes,
BY John B. Brady
ATTORNEY

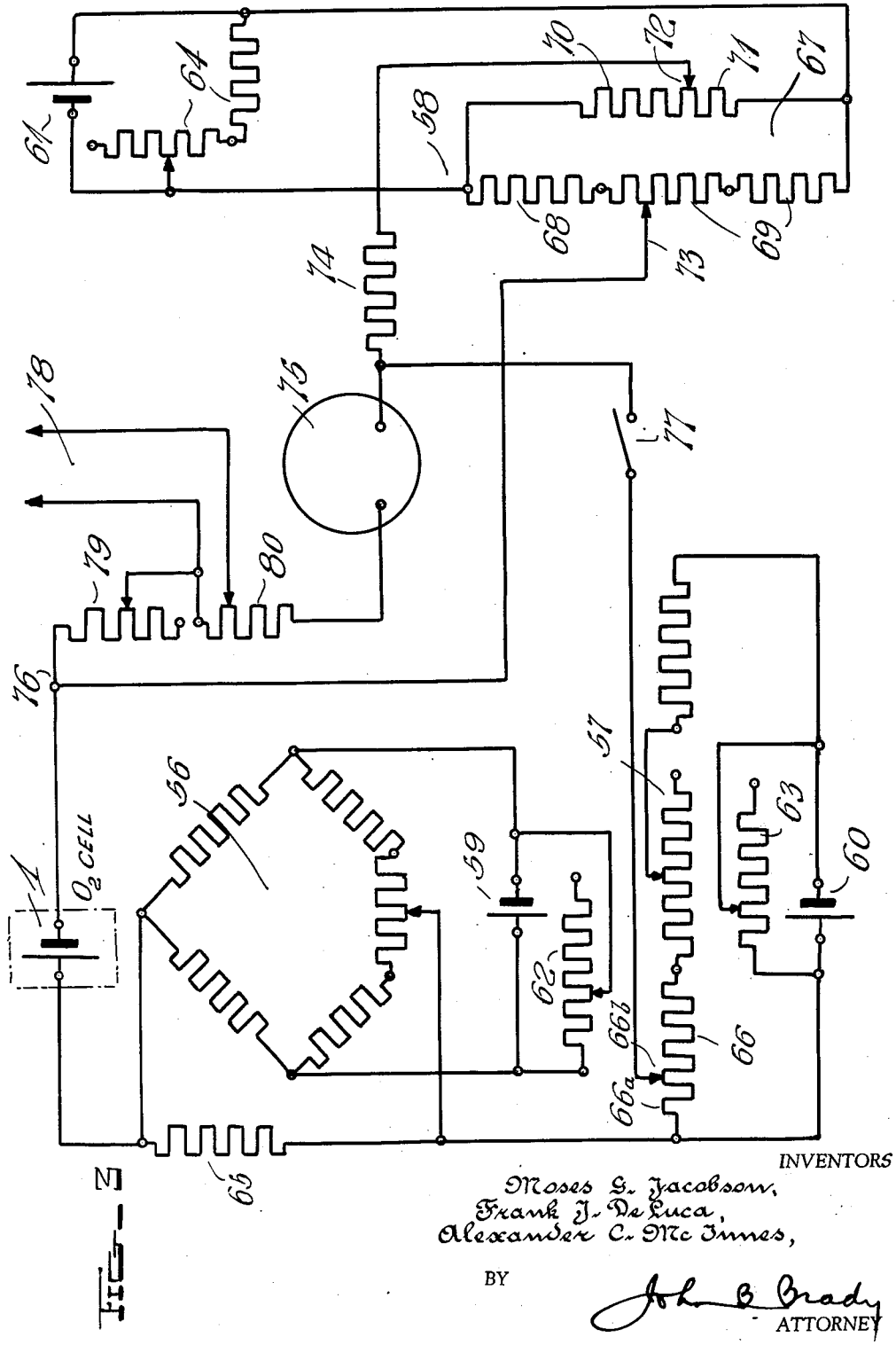

United States Patent Office 2,795,756
Patented June 11, 1957

2,795,756

GAS DETECTION

Moses G. Jacobson, Penn Township, Allegheny County, Frank J. De Luca, Pittsburgh, and Alexander C. McInnes, Murrysville, Pa., assignors to Mine Safety Appliances Co., Pittsburgh, Pa., a corporation of Pennsylvania Application February 27, 1953, Serial No. 339,438

13 Claims. (Cl. 324—30)

Our invention relates broadly to improvements in gas detection and more particularly to a protective circuit arrangement for controlling concentrations of a component in a mixture of gases.

One of the objects of our invention is to provide a protective circuit arrangement for controlling concentrations of a component in a mixture of gases by which the drift of an electric detector cell may be maintained constant within approximately 5% of the scale range for periods of at least 24 hours for insuring accurate determination of components in a mixture of gases.

Another object of our invention is to provide a circuit arrangement for measuring the concentration of an oxidizing component in a gas mixture wherein separate electric circuits are provided coupled through a common adjustable resistor and employing independent sources in the separate circuits whereby drift control is maintained independent of calibration control so that maximum electrical efficiency is obtained in the operation of a detector cell in the determination of the concentration of an oxidizing component in a gas mixture.

In preceding instruments of this type, as described in the copending application of Moses G. Jacobson, Serial Number 338,939 filed February 26, 1953, for Electrochemical Method and Apparatus for Gas Detection, the drift control and calibration control were in the same electric circuit. It was therefore impossible to adjust one without having to completely readjust the other, requiring a substantial period of time. Also, due to the increased burden imposed on the auxiliary dry cell of the combined drift and calibration circuit, the dry cell would discharge very fast and require more frequent replacement. In the present invention, an independent drift control circuit is introduced with its own dry cell, which allows independent adjustment of the drift to be made and permits the renewal of the dry cell of the drift circuit to be made without exchanging the dry cell of the calibration control circuit, and thus enables the detector electrodes to be maintained in operation for a longer time. It should be noted also that the drift compensation in the present invention, as distinguished from the drift compensation provided in the disclosure of the aforesaid copending application, is injected after the current through the cell has already been decreased by the opposing current from the calibration dry cell, and, thus, the drift compensation representing a larger part of the net cell current is able to take care of much larger drift rates with everything else being equal.

Another object of this invention is to provide an arrangement for obtaining complete freedom of the indications for oxygen concentration from $CO_2$ when present in the gas mixture in concentrations up to 25%. By use of an acid electrolyte, as set forth in the aforesaid copending application, the influence of $CO_2$ is greatly decreased; however, there are still some small secondary effects observed, which are probably due to the fact that in the presence of $CO_2$ some other process takes place at the cathode besides the usual processes connected with the reduction of oxygen. Our experience has shown that these secondary effects of $CO_2$ are greatly dependent on the electric current through the cell and that when the electric current through the cell is kept below 100 microamperes, this effect of $CO_2$ is decreased to such extent, that it becomes smaller than the present accuracy of our oxygen determination which is about 2% of the scale range.

Our invention will be more clearly understood from the following specification, by reference to the accompanying drawings, in which:

Fig. 2 is a schematic and diagrammatic view of the circuit arrangement of the protective system of our invention;

Fig. 3 is a schematic circuit arrangement showing the circuit arrangement for an oxygen indicator with which our invention is associated;

Fig. 4 is a schematic front elevational view of a valve and door controller and an associated electric switch mechanism employed in the protective circuit of our invention;

Fig. 5 is a top plan view of the arrangement in Fig. 4 and illustrated with the switch and valve and door controller moved to open position;

Fig. 6 is a view similar to the view shown in Fig. 4 except that the valve and door controller are shown moved to a position closing the associated electric switch; and Fig. 7 is a view similar to the view illustrated in Fig. 5 but showing the valve and door controller moved to closed position and the electric switch in closed position, the view showing the top plan view arrangement illustrated in Fig. 6.

By means of the drift control of this invention, the calibration of the oxygen indicator can be kept constant within approximately 5% of the scale range for at least 24 hours. Every 24 hours the instrument is checked against a known concentration and the calibration adjusted if necessary. From time to time it is also necessary to check the zero. When this calibration is carried out, it is necessary instantly to disconnect the alarm and/or control circuits, because otherwise in making the calibration, especially when a lower alarm point is used and the zero is being checked and when the known concentration gas is outside the alarm limits, many times the alarm and control functions would be falsely set into operation. One of the features of this invention is that the control and alarm functions are disconnected not by hand as before but automatically—as soon as the valve admitting the test sample is turned off. Moreover, at the same time a gas sample from a cylinder with a known oxygen concentration is admitted so that no time is wasted and the cell is not left for any length of time without any sample and subject to oxygen exhaustion and eventual leaking in of air. When, after calibration, the flow of test sample is again turned on, it is necessary to introduce a delay of the order of 30—50 seconds for the sample to get to the detector electrode and produce the proper change in electric current. If that were not done, and the calibration gas happens to be above or below the set alarm or control points, again a false alarm would be given.

Figure 1:
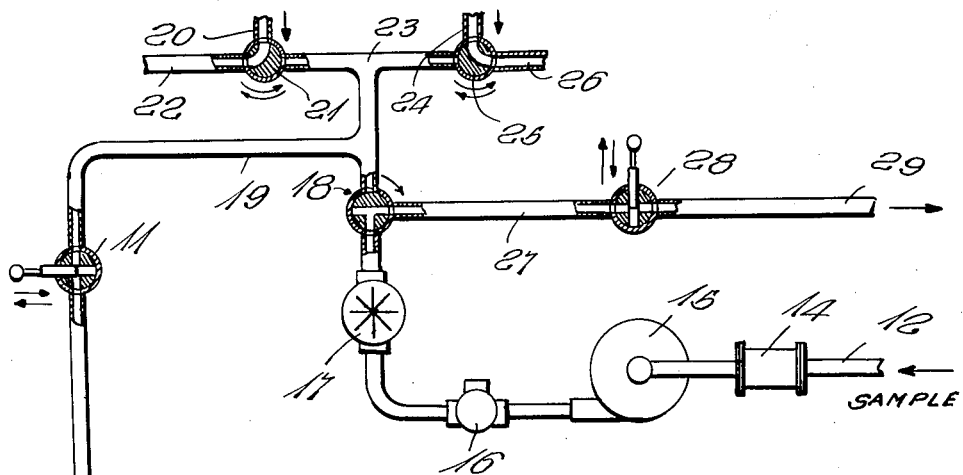
Figure 1 is a schematic flow and assembly diagram of an oxygen indicator to which the protective circuit of our invention is applied.
Figure 1:
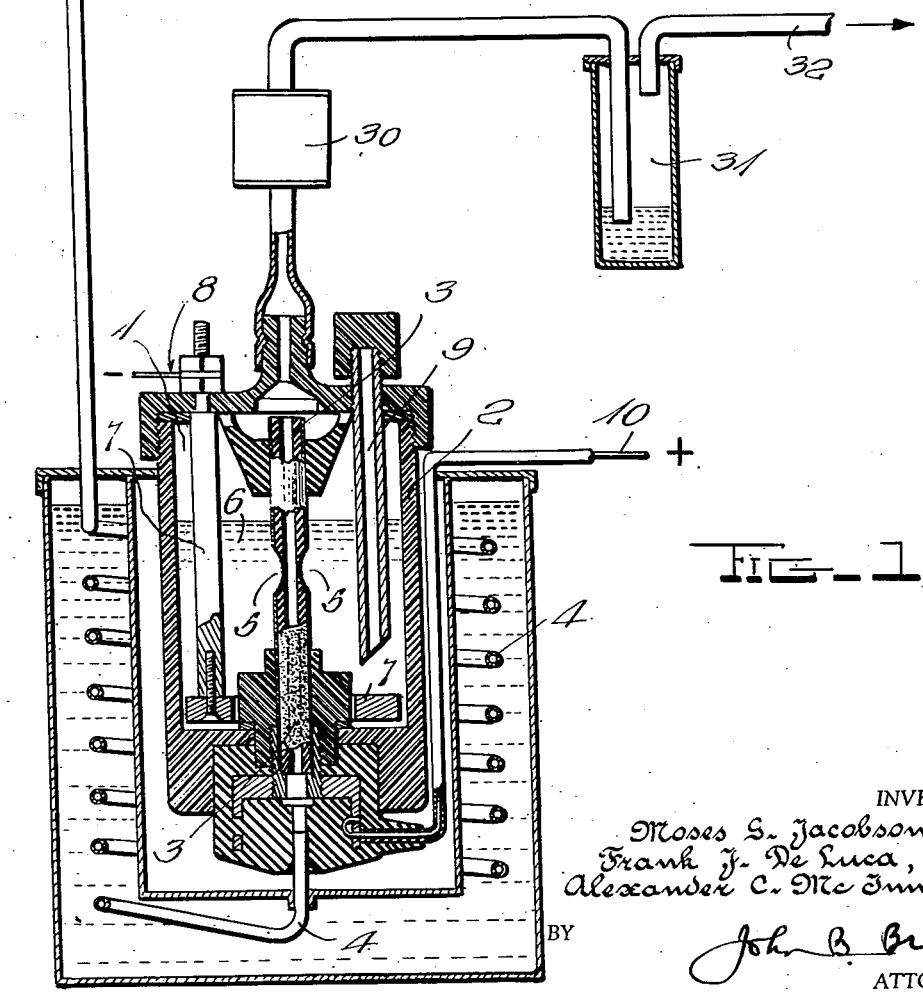

Referring to the drawings in detail, Figure 1 is a schematic flow diagram for an oxygen indicator in which the electric detector cell is indicated by reference character 1 arranged in a closed casing of insulation material 2 and including an axially extending tubular carbon electrode 3 through which gas is introduced through pipe line 4. The carbon electrode 3 is illustrated as including windows 5 permeable to gas but impermeable to liquid and submerged in the electrolyte 6. In insulated relation to the carbon electrode 3 constituting the cathode, there is provided the annular anode 7 supported from the casing of insulation material through the electrical conductive support and providing an electrical connection 8 for the anode exteriorly of the cell 1. The electrolyte may be renewed from time to time through tube 9 which may be opened from the top of the cell. The carbon electrode 3 forming the cathode is electrically connected through conductor 10. The gas supply which is introduced through the interior bore of cathode 3 passes through the spirally coiled tube 4 which is connected through the flow control valve 11 which may be a needle valve to the system through which the sample is introduced. We have shown pipe line 12 through which the sample is introduced and passed through filter 14 under control of pump 15 and check valve 16 through pressure regulator 17 and two way valve 18 to the pipe line 19 leading to flow control valve 11. The natural gas or pre-purified nitrogen for zeroing is introduced at pipe line 20 and passed through two way valve 21 either to the vent 22 for flushing or to the pipe line 23 for delivery to the detector cell 1. The known concentration for calibrating is supplied through pipe line 24 and two way valve 25 and directed either to the vent for flushing shown at 26 or to the pipe connection 23. A by-pass pipe line 27 extends from valve 18 through flow control valve 28 to the by-pass 29.

The gas which passes through the internal bore of cathode 3 enters the receiver 30 for an electrical flow meter and then passes through the bubbler 31 to the exhaust 32.

To further increase the foolproofness of operation, the construction shown in Figs. 4–7 of the drawings is provided by means of which the door 33, whose opening with respect to frame 34 makes accessible the calibration controls, is provided with a finger 35 that fits under the handle 36 of the valve 18 which admits the test sample when this valve is in the open position; and only when the valve is turned so that the test sample is completely shut off, can the door of the case be opened. The valve handle 36, when in the open position marked sample at 12, pushes down on the button 37 of the "Microswitch" 38 which then is in the position shown on Fig. 2 shorting points 39 and 41. When the valve handle 36 is turned in the by-pass position shown in Fig. 1 where the sample flow is closed to the cell 1 and directed to the by-pass 29 simultaneously with releasing the door 33 for opening, switch 38 disconnects 39 from 41 and connects it to 40, and audible alarm 46 is disconnected, as well as the visual light 47 which indicates whether the alarm is on or off. Simultaneously solenoid 48 operates valve 18 which is in the line from the calibration cylinder to the detector cell 1.

The alarm and/or control circuit is also opened by switch 50 which is operated by the opening of the door 33 of the instrument case. When the door 33 is closed and the valve 18 of Fig. 4 is turned back into the sample position, switch 38 again connects 39 to 41 and the closing of the door 33 closes switch 50; but the alarm and control circuits are not yet on because switch 51 on the normally closed delay device 52 is still open and will stay open until the bimetallic strip and winding 53 of which switch 51 is formed is cooled off. As a delay device, an Amperite Thermostatic Delay Relay, Cat. No. 115C45, may be used. Also a relay with a dashpot delay action can be used. The alarm circuit includes the timer 54 operating switch 55 interposed between the audible alarm 46 and the visual indicator light 47 as shown.

The description herein is given by way of an example of a specific embodiment of the invention and is not to be considered as a limitation: the complete inventive concept with respect to this feature consists in linking the operation of the alarm and control circuits not only with the admission of the test sample but also with the access to the controls, and not only with both of these functions separately but also with both of them simultaneously. The alarm and control functions are linked directly to the opening of the case door by means shown in Figs. 4–7.

Experience has shown that operators, after carrying out a calibration, frequently forget to turn the instrument back to the process sample and, thus, have the instrument running in an inoperative condition. The linking of the operation with the position of the sample admission valve effectively prevents this, while the feature that the door must be closed before, by closing of switch 50, the alarm and control functions become operative as indicated by the lighting up of pilot light 47 preventing any possible omission of closing the door 33 before turning the sample admitting valve into the open position.

To accomplish this double protection, two switches may be used as shown in Fig. 2, one operated by the opening and closing of the door 33, and the other by turning on and off of the sample admitting valve 18. However, it is also possible to carry out these two functions by means of a single switch as shown on Fig. 4, the finger 36 attached to the door by itself being insufficient to move the push-button 37 of the switch 38 and only after the valve handle is moved over the finger 36 is the latter pushed down sufficiently to operate the switch 38.

Fig. 3 shows a schematic circuit arrangement for an oxygen indicator with which our invention is associated. The detector cell 1 is shown associated with a drift control circuit 56; a calibration control circuit 57; and a zero control circuit 58. Each of these circuits is constituted by resistor elements arranged in a network and each network is connected with a separate source of direct current as shown by the dry cell batteries at 59, 60 and 61. The dry cell battery 59 in the drift control circuit 56 is shunted by variable resistor 62. The dry cell battery 60 in the calibration control circuit 57 is shunted by variable resistor 63. The battery 61 in the zero control circuit 58 is shunted by variable resistor 64.

A resistor 65 is arranged in series with the detector cell 1 and is the diagonal element of the Wheatstone bridge comprising the network 56.

The part 66a of variable resistor 66 is connected in common to the detector cell circuit and the calibration circuit 57. The currents from dry cell battery 60 and oxygen detector cell 1 add up in the common resistance 66a while in all other parts of the dry cell circuit 1 they subtract. The resistor 66 is varied by moving slider 66b until the net current through detector cell 1 is 100 microamperes or less. We have found that by doing this in addition to providing an acid electrolyte as claimed in the copending application of Moses G. Jacobson, Serial No. 338,939 supra, we are able to make the oxygen determinations entirely free from influence of $CO_2$ in concentrations up to 25% and of other acid gases in considerable concentrations.

The zero control circuit 58 is also formed by a Wheatstone bridge circuit 67 used as a voltage divider. The bridge is composed of four arms 68, 69, 70 and 71 constituted by resistors. At least one of the two parallel branches of the bridge, for instance 70 and 71, is formed by a variable resistor. By adjusting the slider 72 of this variable resistor the voltage output across 72 and 73 can be adjusted to any desirable magnitude. This voltage then is applied through high resistance 74 to the detector circuit across meter 75 and point 76 near the negative terminal of the detector cell 1. The polarity of the connection is such that the current derived from the zero control circuit 58 subtracts from the dry cell circuit current going through meter 75 but adds to other parts of the detector circuits. Switch 77 serves to switch off any current through the detector cell.

The input to the recorder is shown at 78 connected through adjustable resistors 79 and 80 which serve as adjustable potentiometer resistances to apply the output from the detector cell 1 through a graphic recorder such as the Leeds & Northrup "Micromax" or the "Brown Electronic Recorder."

While we have described our invention in certain preferred embodiments we realize that modifications may be both in the mode of carrying out our invention and in the apparatus described herein and accordingly we desire that it be understood that no limitations upon our invention are intended other than may be imposed by the scope of the appended claims.

What we claim as new and desire to secure by Letters Patent of the United States is as follows:

1. In an instrument for controlling concentrations of a component in a mixture of gases, an electrical control system adapted to be actuated by concentrations of said gas outside of certain pre-set limits, a valve for admission of a sample of said gas mixture to a detector cell, an electric switch adapted to connect and disconnect the circuit of said control system, an interlock between said valve and said control system so connected that the control system is connected only when said valve is in the open position and is disconnected when said sample flow is shut off by the valve, and means for delaying the closing of said control circuit after said switch is closed for a time period long enough for the gas sample to come through the detector cell and for the latter to respond.

2. In an instrument for controlling concentrations of a component in a mixture of gases, an electrical control system adapted to be actuated by concentrations of said gas exceeding a certain pre-set concentration or being below a certain pre-set concentration, a valve for admission of a sample of said gas mixture to a detector cell, an electric switch adapted to open the circuit of said control system by the closing of said valve, and means in circuit with said switch comprising a device for causing a delay in closing said control circuit after said switch is closed for a period long enough for the gas sample to come through to the detector cell and for the latter to respond.

3. In an instrument for controlling concentrations of a component in a mixture of gases, an automatic control circuit operated substantially by electrical means and adapted to be actuated by concentrations of said gas outside a pre-set upper limit and/or a pre-set lower limit, a valve for admission of a sample of said gas mixture to a detector cell, a normally closed electrically operated valve for admission for calibration purposes of a sample with a known concentration of the gas to be tested, an electric double throw switch adapted in one position to close the control circuit and in its other position to open said circuit and simultaneously to close the circuit of said electrically operated valve, and means in circuit with said switch for causing after said switch is thrown in the position necessary to close said control circuit a delay long enough for the gas sample to reach the detector cell and for the latter to respond to it.

4. In an instrument for controlling concentrations of a component in a mixture of gases, an automatic control system operated substantially by electrical means and adapted to be actuated by concentrations of said gas outside a pre-set upper limit and/or a pre-set lower limit, a valve for admission of a sample of said gas mixture to a detector cell, a normally closed electrically operated valve for admission for calibration purposes of a sample with a known concentration of the gas to be tested, an electric double throw switch adapted in one position to close said control circuit and in its other position to open it and simultaneously to close the circuit of said electrically operated valve, means for operating said switch by the opening and closing of said valve for sample admission, and means in circuit with said switch for causing, after said switch is thrown in the position necessary to close said control circuit, a delay long enough for the gas sample to reach the detector cell and for the latter to respond to gas sample.

5. In an instrument for controlling a component in a mixture of gases, a valve for admission of a sample of said gas mixture to a detector cell, a number of controls mounted on a panel for calibration and setting of the instrument to correct operation, a case totally enclosing said panel, a door closing said case and making said controls inaccessible when closed, an electric switch operated by said valve for admission of the test sample, said switch being adapted to disconnect said control functions while said valve is in the closed position, and a second switch operated by said case door adapted to disconnect said control functions when said door is opened.

6. In an instrument for controlling a component in a mixture of gases, a valve for admission of a sample of said gas mixture to a detector cell, a number of controls mounted on a panel for calibration and setting of the instrument to correct operation, a case totally enclosing said panel, a door closing said case and making said controls inaccessible when closed, and an electric switch adapted to energize the control circuit only when both said door is closed and said valve is in the sample admitting position and to de-energize the control circuit when either the valve is in the closed position or the door open.

7. In an instrument for indicating and/or controlling a component in a mixture of gases, a valve for admission of a sample of said gas mixture to a detector cell, said valve being mounted on a panel separate from but adjacent to the instrument case containing all other parts thereof and being fitted with a rotary handle elongated on one side, a panel containing all electrical control elements of said instruments, a cover totally enclosing said control panel, a part attached to said cover and extending to said rotary handle, a fitting disposed under the elongated part of said handle and being retained by it when said valve is in the open position and being free when said valve is in the closed position.

8. In an instrument for controlling a component in a mixture of gases, a valve for admission of a sample of said gas mixture to a detector cell of the rotary on-off type, said valve being mounted on a panel separate from but adjacent to the instrument case containing other parts and all control elements of the instrument, an elongated handle for turning said valve from the open to the shut position, an electric switch of the push type mounted adjacent to said valve with the actuator thereof protruding through an aperture in the panel, said actuator being located underneath said handle when said valve is in the open position and leaving a clearance between said handle and said actuator, and a flexible member attached to said instrument case cover and extending to and beyond said clearance between the actuator and the valve handle and barely touching the upper surface of said actuator when the door is closed but not operating the switch until the valve handle is closed and displaces said actuator.

9. In an electrical circuit for the measurement of oxygen concentration in a mixture of gases by means of a detector cell circuit subject to decay of electrical output, a first auxiliary circuit powered by a source of auxiliary power supply subject to decay of the same order of magnitude as the decay of said detector cell circuit, means for adjusting the decay rate of said auxiliary power supply and circuit connections between said auxiliary power supply and said detector cell circuit opposing the current and decay from said sources to each other in parts of the circuit, a third circuit powered by an independent auxiliary power supply source subject to a rate of decay of the same order as that of the first source of power, means for adjusting said decay rate, and circuit connections injecting a part of the current of said independent auxiliary circuit into a part of said detector circuit, wherein the amount and decay rate are decreased by opposition from said first auxiliary circuit.

10. In an electrical circuit for the measurement of oxygen concentration in a mixture of gases by means of a detector cell circuit subject to decay of electrical output, a first auxiliary circuit powered by an auxiliary power supply source subject to decay of the same order of magnitude as the decay of said detector cell circuit, means for adjusting the decay rate of said auxiliary power supply source, and circuit connections between said auxiliary power supply source and said detector circuit opposing the current and decay from said sources to each other in parts of the circuit, a third circuit powered by an independent source subject to a rate of decay of the same order as that of the first mentioned source, means for adjusting said decay rate, and circuit connections injecting a part of the current of said second auxiliary circuit into a part of said detector circuit, wherein the amount and decay rate are decreased by opposition from said first auxiliary circuit, and means for adjusting the decay rates of said two auxiliary power sources until the net decay rate in a part common to all three circuits is equal to zero.

11. In an electrical circuit for the measurement of oxygen concentration in a mixture of gases by means of a detector cell subject to decay of electrical output, a first auxiliary circuit powered by a source of power subject to decay of the same order of magnitude as the decay of said detector cell, circuit connections between said auxiliary and said detector circuits opposing the currents and decay from said sources to each other in parts of the circuit, including a means for adjusting the amount of current injected from said auxiliary circuit into said detector circuit, a third circuit powered by an independent source subject to decay of the same order as the first auxiliary source, means for injecting the current from said second auxiliary circuit into a circuit part that is common to the detector circuit and the said first auxiliary circuit, and means to adjust the amount of the injected current from the second auxiliary circuit until the decay rate in a part common to all three circuits is equal to zero.

12. In an electrical circuit for the measurement of oxygen concentration in a mixture of gases by means of a detector cell subject to decay of electrical output, a first auxiliary circuit powered by a source of auxiliary power supply subject to decay of the same order of magnitude as the decay of said detector cell, means for adjusting the decay rate of said auxiliary power supply, circuit connections between said auxiliary circuit and said detector circuit opposing the current and decay from said sources to each other in parts of the circuit and means for adjusting the current in one of the elements of said circuit connections to control the amount of opposition introduced from the auxiliary circuit into the detector circuit, a second auxiliary circuit with an independent power source, means for adjusting the rate of decay of said power source, circuit connections for combining an adjustable part of the current output of said second auxiliary circuit with a part of the detector circuit, that is modified by combination with said first auxiliary circuit, and adjusting the decay rates of the two auxiliary circuits and the amount of their interaction with the detector circuit until a zero decay rate is obtained in a part of the circuit where all three circuits are combined.

13. In an electrical circuit for the measurement of oxygen concentration in a mixture of gases by means of a detector cell circuit subject to decay of electrical power output and in which the rate of said decay is depending on the current burden, a first auxiliary circuit and circuit connections between said auxiliary circuit and said detector cell circuit opposing the current burden on said detector cell, a second auxiliary circuit powered by a source of electric power subject to a decay of the same order of magnitude as the output from said detector cell after its decrease by the first auxiliary circuit, means for injecting an adjustable part of the current from said second auxiliary power source into a part of the circuit wherein the electric current from the detector cell and the decay rate is already substantially decreased by combination with the first auxiliary circuit and means for adjusting the decay rate of said second auxiliary power source until the net decay rate in a part common to all three circuits is reduced to a minimum.

References Cited in the file of this patent

UNITED STATES PATENTS

| | | |
|---|---|---|
| 1,472,125 | Keeler | Oct. 30, 1923 |
| 1,474,594 | Keeler | Nov. 20, 1923 |
| 1,729,864 | Brown | Oct. 1, 1929 |
| 2,155,524 | Beebe | Apr. 25, 1939 |
| 2,439,354 | Wolcott | Apr. 6, 1948 |
| 2,540,674 | Jacobson | Feb. 6, 1951 |